United States Patent
Dahlman et al.

(10) Patent No.: US 11,188,716 B2
(45) Date of Patent: Nov. 30, 2021

(54) TEXT DISPLAY WITH VISUAL DISTINCTIONS PER CLASS

(71) Applicant: International Business Machines Corporation, Armonk, NY (US)

(72) Inventors: Rebecca L. Dahlman, Rochester, MN (US); Jennifer L. La Rocca, Cary, NC (US); Kristin E. McNeil, Charlotte, NC (US); Mario J. Lorenzo, Miami, FL (US); Joshua M. Lee, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 198 days.

(21) Appl. No.: 16/249,769

(22) Filed: Jan. 16, 2019

(65) Prior Publication Data
US 2020/0226219 A1   Jul. 16, 2020

(51) Int. Cl.
*G06F 40/10* (2020.01)
*G06F 40/30* (2020.01)
*G06F 16/35* (2019.01)

(52) U.S. Cl.
CPC ............ *G06F 40/30* (2020.01); *G06F 16/358* (2019.01)

(58) Field of Classification Search
CPC ...... G06F 40/10; G06F 40/106; G06F 40/109; G06F 40/117; G06F 40/20; G06F 40/205; G06F 40/211; G06F 40/226; G06F 40/30; G06F 40/35
USPC ...................................... 704/9, 1, 7, 10, 276
See application file for complete search history.

(56) References Cited

U.S. PATENT DOCUMENTS

| | | | |
|---|---|---|---|
| 4,270,284 A | 6/1981 | Skellings | |
| 4,965,765 A | 10/1990 | Brown | |
| 6,279,017 B1 | 8/2001 | Walker | |
| 8,887,044 B1* | 11/2014 | Goodspeed | G06F 3/0483 715/703 |
| 9,405,448 B2 | 8/2016 | Reiter | |
| 9,514,124 B2 | 12/2016 | Allen | |
| 9,589,049 B1 | 3/2017 | Carrier | |
| 9,959,311 B2 | 5/2018 | Boguraev | |
| 10,042,921 B2 | 8/2018 | Boguraev | |

(Continued)

FOREIGN PATENT DOCUMENTS

NL   8900247 A   9/1990

OTHER PUBLICATIONS

Anonymous; "Collaborative Annotation Enhancement"; Nov. 28. 2012; 5 pages; ip.com.

(Continued)

*Primary Examiner* — Qi Han
(74) *Attorney, Agent, or Firm* — Fabian VanCott; Steven L. Nichols

(57) ABSTRACT

According to a computer-implemented method, an output is received resulting from natural language processing of unstructured text. In the output different phrases of the unstructured text are categorized into classes. A different visual distinction is generated for at least one class. A generated visual distinction is applied to phrases in the unstructured text based on their respective class. The unstructured text is displayed such that phrases in the unstructured text that correspond to the at least one class appear with the corresponding visual distinction indicative of that class.

20 Claims, 6 Drawing Sheets

(56) References Cited

U.S. PATENT DOCUMENTS

| 2012/0212337 | A1* | 8/2012 | Montyne | G10L 15/26 |
| | | | | 340/501 |
| 2014/0067369 | A1* | 3/2014 | Stavrianou | G06F 40/289 |
| | | | | 704/9 |
| 2017/0083569 | A1 | 3/2017 | Boguraev | |
| 2018/0060306 | A1* | 3/2018 | Starostin | G06F 40/284 |
| 2019/0370746 | A1* | 12/2019 | Martinos | G06Q 10/08355 |

OTHER PUBLICATIONS

Anonymous: "System and Method for retrieving specific image and video content from natural language queries"; Sep. 15, 2013; 5 pages; ip.com.

Andrews et al.: "A Classification of Semantic Annotation Systems": Semantic Web—Interoperability, Usability, Applicability; 2011: IOS Press; 27 pages.

Anonymous; "Determining High-Level Topical Annotations for a Conversation"; Jan. 3, 2018; 34 pages; ip.com.

Li, X. et al.; "Rich Annotation Guided Learning"; 17 Pages; Published 2012.

Rusu, D. et al.; "Automatically Annotating Text With Linked Open Data"; 5 pages; Mar. 29, 2011.

\* cited by examiner

TEXT DISPLAY WITH VISUAL DISTINCTIONS PER CLASS

BACKGROUND

The present invention relates to the display of unstructured text, and more specifically to the display of unstructured text where visual distinctions are used to identify different classes of phrases of the unstructured text, the classes identified via a natural language processor. Natural language processing is an operation wherein a computer can collect information from unstructured text. That is, natural language processing is performed on unstructured text to extract information that can be used in a structured way. For example, from the text "He is 40 years old" a natural language processor can extract the insight of "age" with a value of 40. Such information provides context to the unstructured text. That is, natural language processing allows a computing device to understand natural language data.

SUMMARY

According to an embodiment of the present invention, a computer-implemented method is described. According to the method, an output is received, which output results from natural language processing of unstructured text. In the output, different phrases of the unstructured text are categorized into classes. A visual distinction is generated for at least one class. Generated visual distinctions are applied to phrases in the unstructured text based on their respective class. The unstructured text is displayed such that phrases in the unstructured text corresponding to the at least one class appear with the corresponding visual distinction indicative of that class.

The present specification also describes a system. The system includes an input device to receive an output resulting from natural language processing of unstructured text. In the output, different phrases of the unstructured text are categorized into classes. A visual distinction generator of the system generates a visual distinction for at least one class and a text editor applies generated visual distinctions to phrases in the unstructured text based on their respective class. A display device of the system displays the unstructured text such that phrases in the unstructured text corresponding to the at least one class appear with the corresponding visual distinction indicative of that class.

The present specification also describes a computer program product. The computer program product includes a computer readable storage medium having program instructions embodied therewith. The program instructions executable by a processor cause the processor to receive user input regarding natural language processing characteristics and apply natural language processing to the unstructured text. The program instructions are executable by the processor to cause the processor to receive an output resulting from natural language processing of unstructured text. In the output, the different phrases of the unstructured text are categorized into classes that include 1) a concept class, 2) an attribute class, 3) a pre-built annotator output class, 4) a contextual concept finding class, 5) a filtered term class, and 6) a qualifier class. The program instructions are executable by the processor to cause the processor to generate a visual distinction for at least one class and to generate a number of sub-distinctions for at least one visual distinction. A sub-distinction is associated with a different value within a class. The program instructions are executable by the processor to cause the processor to apply generated visual distinctions and sub-distinctions to a respective class and value and to display the unstructured text in which phrases in the unstructured text corresponding to the at least one class appear with the corresponding visual distinction and sub-distinction indicative of that class and value.

DETAILED DESCRIPTION

Figure 1:
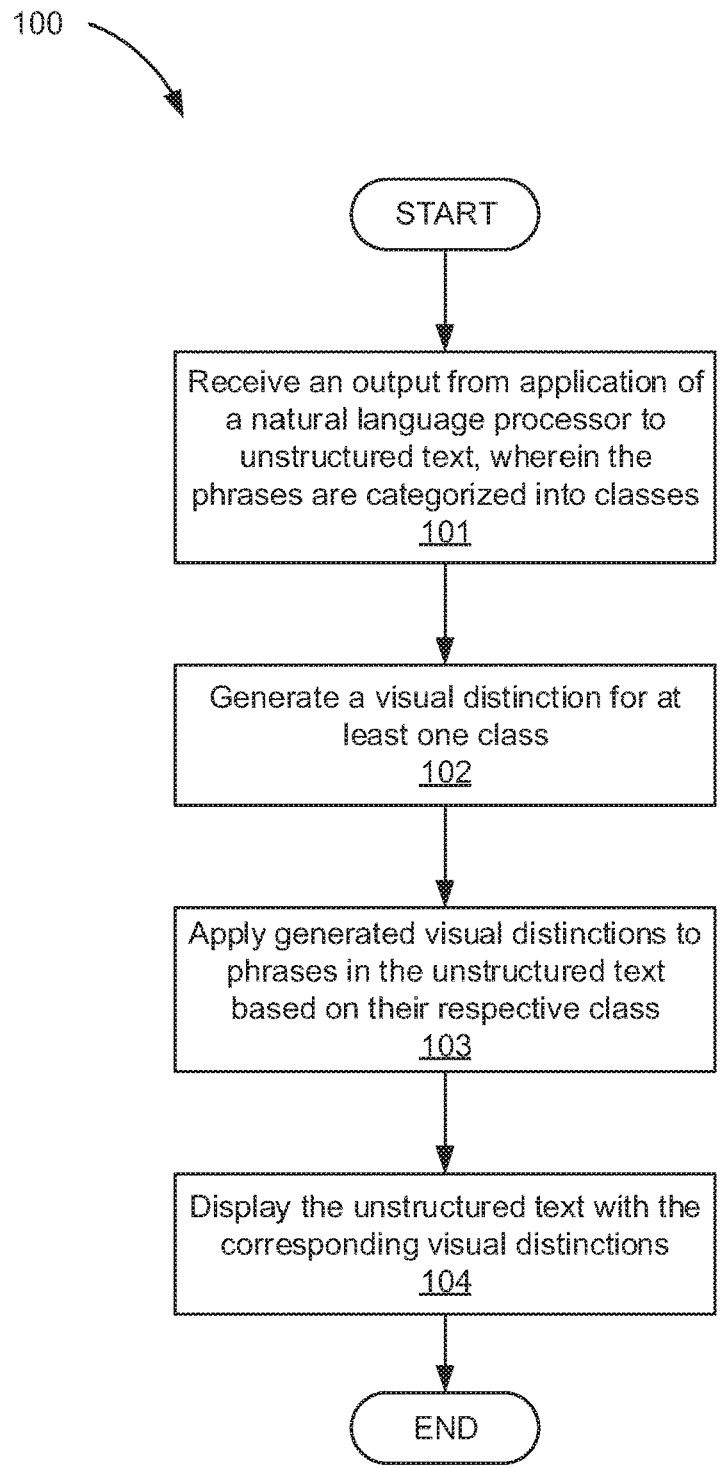
FIG. 1 depicts a flowchart of the method for displaying unstructured text with visual distinctions per class, according to an example of the principles described herein.

The present invention may be a system, a method, and/or a computer program product any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Natural language processing (NLP) refers to a method where natural language is interpreted into a form understandable by computers. Historically, computers were unable to understand natural spoken language and the variety of ways a particular concept could be shared. For example, the word "foot" can be used as an indication of a body part or as a unit of measurement and computing devices could not determine which form of the word is intended. Moreover, while computers can understand words, for example as included in code, a computer could not extract meaning from the text. This is because natural language is in an unstructured and complex form. NLP in its various forms adds structure to the unstructured text. For example, it may perform complex operations to determine the proper interpretation of a term.

A natural language processor, or an annotator is a text analysis engine that receives unstructured text input and outputs text in a specific structured format, for example by classifying or categorizing the unstructured text. The output of the annotator includes annotations which refer to generated metadata about a specific span of unstructured text. Once phrases of unstructured text are tagged with metadata indicating a class, those tags may be used to perform any variety of NLP operations such as semantic determination, language translation, and text summarization. Any number of these annotators may make up an NLP model. In some examples, the NLP model may be referred to as a cognitive model.

Such NLP models may be customized. For example, different industries such as medical, manufacturing, etc. may have specific NLP objectives. Even more specifically, a particular customer may desire a specific NLP model that analyses unstructured text in a particular way and have the analysis result in text that is structured a particular way. Accordingly, a developer or other user may build an NLP model for a customer's particular use case. In so doing, the developer may want to test the results of the different annotators that form part of the NLP model. After deployment, the developer may want to test, or update, the annotators in the NLP model. In either case, the developer may run unstructured text through an annotator to generate the annotated output, i.e., the metadata that is used as part of NLP. In some examples, the annotations are output in a text-based format. That is, the metadata may be presented in a text-based form with a very particular format and structure. When large amounts of text are analyzed and tested, such a textual format annotation may be difficult to read and interpret, especially as a user creates a complex NLP model. For example, it may be difficult for a developer to introspect/debug the categorized/structured output from the NLP model in order to improve precision and recall.

Accordingly, the present specification describes a method wherein a textual format of NLP annotations is displayed in a visual fashion rather than as a text-based format. By so doing, the phrases of the unstructured text are displayed in a user-friendly fashion along with the metadata tags such that a user can easily see how their model is working, which can result in them building a better NLP model or refining an NLP model to be more effective.

The present method may also be used with other types of cognitive models, such as a machine-learning model. In machine-learning, a user trains the machine-learning model with sample phrases. The machine learning model then learns the language patterns by using neural networks and/or statistical algorithms. Accordingly, while the present specification describes an NLP model optimization, the method and system described herein could be used to visualize a machine-learning model as well.

Specifically, the present specification describes a method to visually distinguish different classes of annotations. While specific reference is made to particular classes, different classes and different numbers of classes may be identified via different NLP models. In other words, the subject matter of the present specification in general relates to the visual distinction of different classes of phrases, wherein different classes represent different categories of data as output from a natural language processor. While specific reference is made to certain classes, the output of a natural language processor may distinguish the analyzed unstructured text in any number of ways by categorizing the unstructured text according to different criteria. The present specification visually distinguishes these categorizations from one another.

In general, the term "class" refers to a category of the natural language processor as defined by a developer or the natural language processor. The class may have criteria by which phrases of the unstructured text are deemed to belong to that class. The unstructured text is grouped into classes based on their meeting the criteria.

For example, when building an NLP model, a developer takes a layered approach by identifying different classes of information. These classes may include concepts, attributes, pre-built annotator outputs, filtered terms, contextual concept findings, and qualifiers. A concept class refers to one or more specific words, phrases, numbers, alphanumeric characters, author sequence of characters that represents a specific idea. Concepts may include a word or phrase from any parts of speech. In general, a particular user's NLP model defines certain concepts from certain words/phrase that fit their use case. That is, a user can select particular concepts they are interested in extracting.

An attribute identifies pieces of information pertinent to the domain and are used to promote relevant concept and concept values into attribute values. An attribute utilizes the output of the concept and concept value annotations to generate a higher-level of insight extracted from the unstructured text, in which consumers can define the display name, possible values, and value ranges to fit the needs of their solution. In one specific example, an attribute may be derived from the match of one or more concepts or one or more attributes. When the attribute is generated, a value is associated with it. This value may be one of the following 1) the value associated with the matched concept within the unstructured text 2) "true" if concept is present without a value 3) a defined possible value.". The attribute may not be a text string, but may take another form. For example, a body mass index may be a particular concept and the attribute may be determined from a calculation of the body mass index given an extracted attribute of a particular height and an extracted attribute of a particular weight. From these values the body mass index attribute may be calculated. Moreover, the attribute may be identified in different ways. For example, a name of an individual may be based on identification of certain fields such as "name."

Another example of a class of annotation is a pre-built annotator output. In some examples, the NLP model includes pre-built annotators that output certain annotations. These annotations may be categorized into their own class.

Another example of a class is a filtered term, which refers to those terms/phrases that are to be removed or restricted to just include a subset of the concept and/or concept types. For example, an NLP model may exclude certain concepts from being identified.

Another class of text is a contextual concept finding. The contextual concept finding refers to the context of a particular piece of unstructured text. For example, it may be a section heading. The contextual concept finding class may be divided into a number of sub-classes including for example a negation sub-class, an invalidation sub-class, or a disambiguation sub-class. For example, the phrase "not enrolled in school" is much different than a statement that a student is "enrolled in school." Accordingly, the word "not" may be classified as a negation contextual finding class.

Yet another example of a class is a qualifier, which is defined as a phrase associated with a concept that qualifies that concept. For example, in the unstructured text "he lives in a large house," the term "large" is a qualifier to the concept of "house."

As a specific example, consider the unstructured text, "the patient has controlled diabetes." In this example, the words "has," "controlled," and "diabetes" may be identified as concepts and the words "controlled" and "diabetes" may be pre-built annotator outputs, the word "diabetes" may be an attribute and the word "controlled" may be a qualifier.

According to the method and system described herein, classes are identified with visual distinctions. In this example, rather than presenting a text-based identification of the classes, the output may be the unstructured text with different phrases and/or words visually distinguished based on their class. For example, concepts may be identified with one visual distinction, attributes with another and so on. Different values of the different classes may also be identified visually with sub-distinctions. For example, the concept class may be identified with an underline of the phrase and/or word and different values of the concept class, i.e., different concepts, may be represented differently, for example as different color underline or an underline with a different thickness.

The method, system, and computer program product of the present specification provide a number of benefits. For example, the method and system simplify development of the NLP model. Specifically, the annotation information, which is used to develop an NLP model, is more effectively presented to a developer. More effective presentation allows the developer to more quickly and efficiently develop an NLP model for a customer. For example, a developer can visualize an output of a cognitive model to assess whether or not the output is expected. If the output is not expected, they can refine the model. As a result, the final cognitive model may have less noise. Noise refers to extra information, i.e., class values, that are not relevant for a particular model.

Not only do the current method and system improve the process of NLP model development, but they also enhance the operation of the computing device on which they are implemented. For example, the proposed method allows for the development of more efficient and optimized NLP models. NLP models that are efficient and optimized can run faster, and take up less space. Thus, the present method and system improve memory utilization as well as increase processor bandwidth by resulting in less hardware processing power used to run the analysis of the cognitive model against unstructured text.

As used in the present specification and in the appended claims, the term "natural language processing characteristics" or similar language is meant to be understood broadly as the parameters that specify what types of information is to be looked for. For example, the natural language processing characteristics may identify what tags are, and are not, to be used to identify certain phrases of the unstructured text.

As used in the present specification and in the appended claims, the term "a number of" or similar language is meant to be understood broadly as any positive number including 1 to infinity.

Turning now to the figures, FIG. 1 depicts a flowchart of a method (100) for displaying unstructured text with visual distinctions per class, according to an example of the principles described herein. As noted above, the output from the different annotators of an NLP model may be overwhelming to a developer who is trying to optimize the NLP model. This is because the output may generally be in a text-based format that is not user-friendly and difficult to interpret. Accordingly, the present method (100) allows for a more simple and effective way to present annotations from the annotators of the NLP model.

First, an output from a natural language processor is received (block 101). As described above, the output is the result of an NLP operation on a piece of unstructured text. The output may associate a data class with different phrases of the text. The classes describe different forms of information that may be manipulated and presented to an end user as an operation of the NLP model. In other words, different phrases of the text are categorized into classes. The classes may be of varying types. As a specific example, the phrases may be categorized as concepts, attributes, pre-built annotator outputs, contextual concept findings, filtered terms, and qualifiers.

A different visual distinction may be generated (block 102) for the classes. That is, different classes may be identified by different visual cues. Doing so allows for an easy identification of the class associated with different phrases that make up the unstructured text. The visual identification allows a user to readily ascertain a class of a particular phrase such that it may be analyzed and processed. For example, such visual indication may allow a user to determine if a piece of text has been properly classified, or if certain pieces of text have been improperly classified. The visual indication may also provide information regarding any patterns in the output of the different annotators.

The different visual distinctions may take a variety of forms. For example, the visual distinctions may be selected from the group of text underlining, text strike-through, text highlighting, text font, text font color, text font size, and text font style. That is, each of the different classes may be associated with one of the above-mentioned modifications. For example, a concept class may be associated with a text underline such that phrases that are identified as a concept class may be underlined. Following this example, phrases that are identified as an attribute class may be highlighted and phrases associated with a pre-built annotator output class may be identified with a dashed text underline. Continuing this example, a contextual finding class may be identified with a particular font color and a filtered term class may be identified with a particular font style (i.e., bold, italicized, all caps, etc.). While specific reference is made to particular types of font modifications, any variety of font modification or other visual distinction may be generated (block 102) and associated with the different classes. In fact, in some examples, the method (100) may include presenting a user interface where visual distinctions may be generated (block 102) and associated with the different classes. That is, through the interface a mapping may be generated between classes and particular predetermined or user-generated visual distinctions.

Once the different visual distinctions have been generated (block 102) and the output, along with class-identifying tags, are received (block 101), the computing system applies (block 103) the generated visual distinctions to phrases in the unstructured text based on their respective class. That is, as described above, the output of a natural language processor includes the text and associated metadata. The associated metadata may include a tag that identifies the particular word and/or phrase by its class. Accordingly, the computing system may read this tag and apply the visual distinction mapped to that class/tag. As a particular example, the word "age" may be identified as a concept class via a metadata tag. The computing system may identify and read this tag and underline the word "age." This same process may be applied to a variety of phrases and/or words in the text. In some cases, a word or phrase may be categorized into multiple classes. For example, the phrase "lung cancer" might trigger a concept of "lung cancer" as well as triggering an attribute of "cancer" with the value "lung." Accordingly, a word or phrase may have multiple visual distinctions applied to it. For example, a word may be highlighted—identifying it as an attribute and may also be underlined with a broken underline—identifying it as a pre-built annotator output.

The unstructured text with the corresponding visual distinctions is then displayed (block 104) in the display of the computing device. That is, the computing device may include a display such as a screen. An interface is displayed on the screen that presents the analyzed text as well as the visual annotations described herein. That is, in addition to presenting the analyzed text, the different visual distinctions are also displayed (block 104) such that a user can easily identify the associated class with the corresponding phrase.

Such a visual presentation simplifies the role of an NLP developer. That is, a developer can evaluate whether a particular NLP model is accurately identifying and categorizing particular phrases and can tweak the system in any number of ways to generate more accurate natural language output. As described above, such a system improves computer functionality by improving memory storage efficiency as an NLP model can be more easily tailored and customized to a particular application, thus alleviating the use of bulky, NLP models that include extraneous components which may not be needed and that take up valuable storage space. Moreover, the job of a developer is simplified as he/she can more effectively refine and tweak a particular NLP model before deployment and during deployment to more readily meet the needs of a particular customer.

Figure 2:
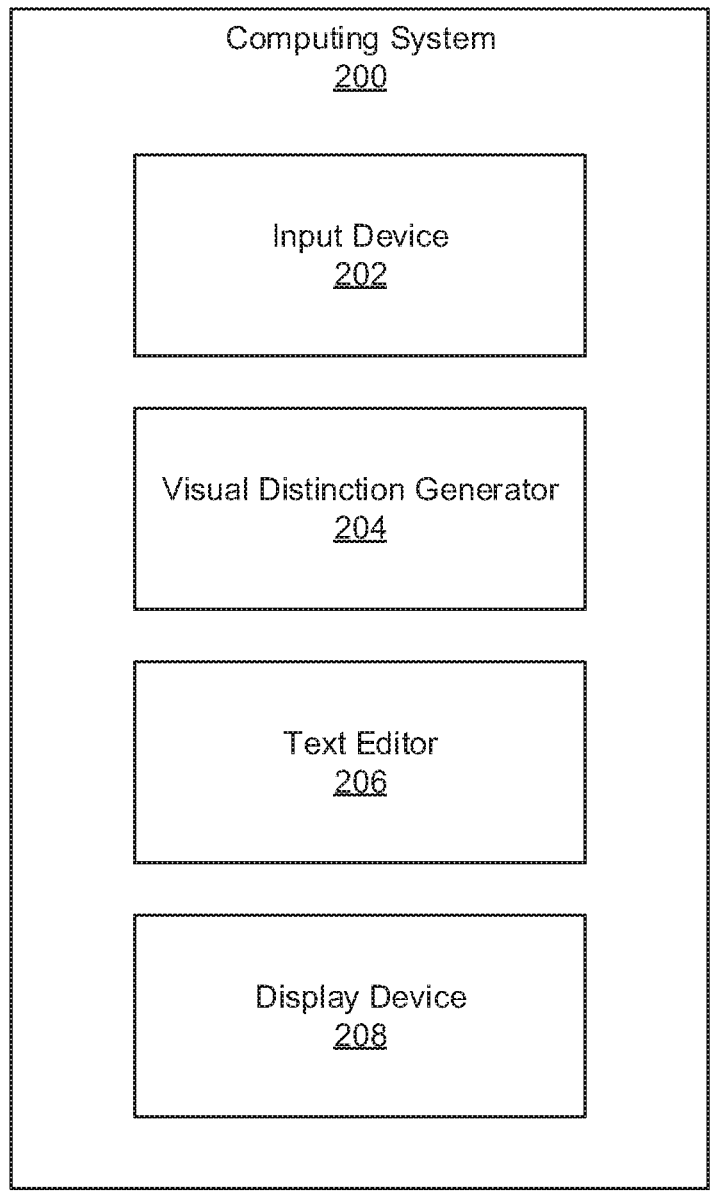
FIG. 2 depicts a computing system for displaying unstructured text with visual distinctions per class, according to an example of principles described herein.

FIG. 2 depicts a computing system (200) for displaying unstructured text with visual distinctions per class, according to an example of principles described herein. To achieve its desired functionality, the computing system (200) includes various components. Each component may include a combination of hardware and program instructions to perform a designated function. The components may be hardware. For example, the components may be implemented in the form of electronic circuitry (e.g., hardware). Each of the components may include a processor to execute the designated function of the component. Each of the components may include its own processor, but one processor may be used by all the components. For example, each of the components may include a processor and memory. Alternatively, one processor may execute the designated function of each of the components.

In general, the computing system (200) may be disposed on any variety of computing devices. For example, the computing device may be on a desktop computer or on a laptop computer, or any other such device that includes processors and hardware components. The computing system (200) includes a variety of components. For example, the computing system (200) includes an input device (202). The input device (202) receives the output from a natural language processor that has analyzed a piece of unstructured text. As described the operation of the natural language processor generates structured text. The structured text is unstructured text that is supplemented with metadata tags. The metadata tags may be used for any number of purposes including semantic annotation and/or text summarization. In some examples, the natural language processor may be disposed on another computing system. In this example the input device (202) may receive the structured text object through some electrical connection such as a wireless or wired connection. As described above, the structured text output may include the actual phrases in the structured text and metadata tags that indicate the classes that are associated with the phrases.

The computing system (200) also includes a visual distinction generator (204) which generates the visual distinctions for at least one class. As described above, the visual distinction generator (204) may include a user interface that guides a user through a mapping of visual distinctions to various text classes. For example, the visual distinction generator (204) may present a list of different classes and in some cases may allow the creation of new classes. Through this visual distinction generator (204) a user may select particular visual distinctions to map to predetermined or new classes. The user may also customize particular visual distinctions. The user may then map, or otherwise associate visual distinctions to a particular class.

The text editor (206) of the system applies these visual distinctions to the phrases associated with the respective classes. For example, phrases identified as concepts may be underlined, phrases identified as attributes may be highlighted, phrases identified as pre-built annotator outputs may be underlined with a dashed line, contextual phrases may have their font color changed, and filtered terms may have a modification applied to their font style. Accordingly, what is ultimately presented by the display device (208) is the unstructured text along with the associated visual distinction. That is, the display device (208) may present on a screen, the structured text in which phrases in the structured text corresponding to the at least one class appear with the corresponding visual distinction.

Figure 3:
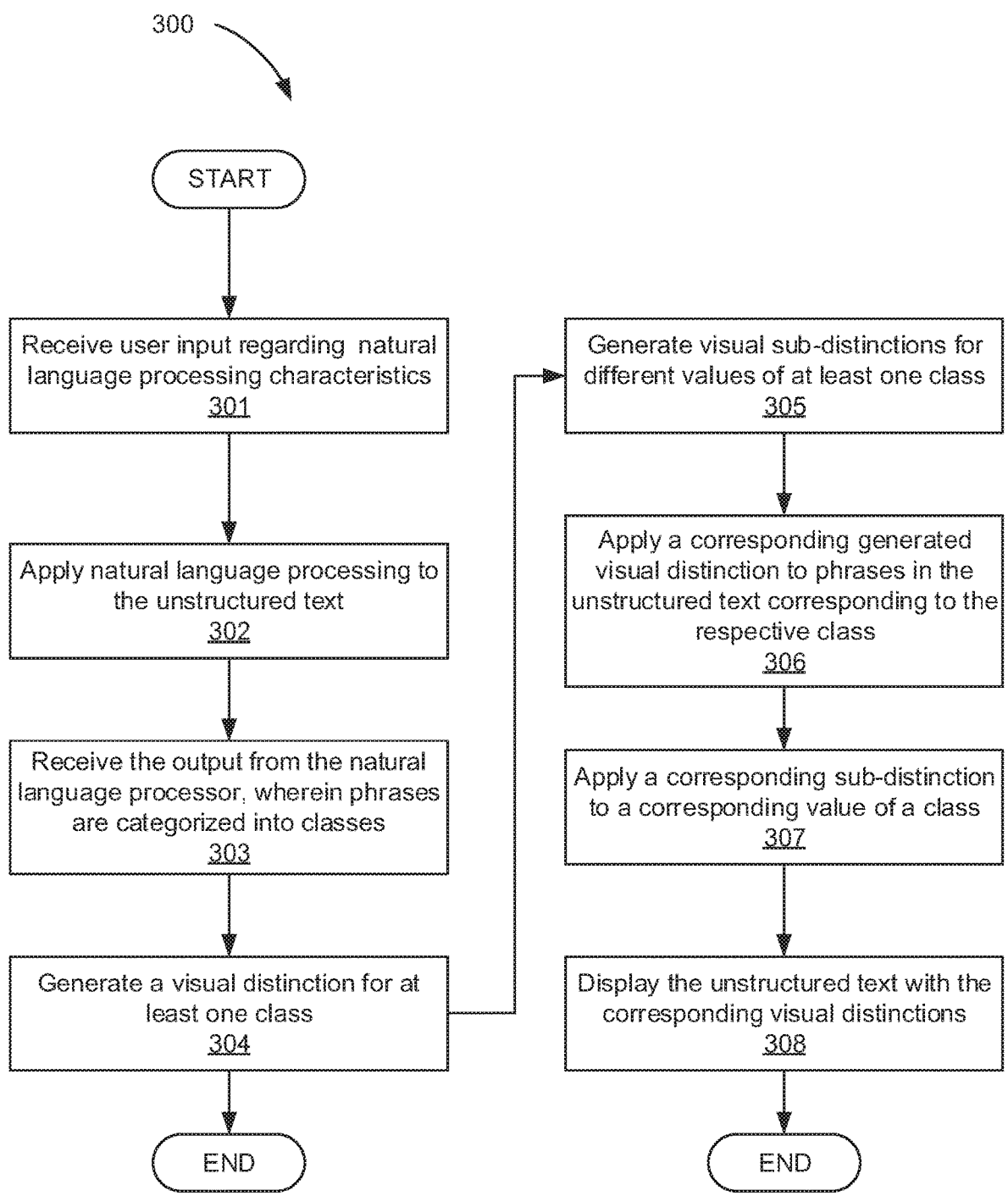
FIG. 3 depicts a flowchart of the method for displaying unstructured text with visual distinctions per class, according to another example of principles described herein.

FIG. 3 depicts a flowchart of a method (300) for displaying unstructured text with visual distinctions per class, according to another example of principles described herein. In this example, the method (300) includes receiving (block 301) user input regarding the natural language processing characteristics. That is, NLP can identify a wealth of information and some of that information may not be needed in certain applications. Accordingly, the user input indicates specifically what types of information is to be looked for, i.e., what type of metadata tags are to be assigned. The natural language processing characteristics are utilized at runtime to generate the desired metadata annotations. For example, a user may select to de-activate certain pre-built annotators. For example, in the medical field certain pre-built annotators may be built. One example, is an allergy annotator that is specifically designed to analyze unstructured text in the context of an allergy diagnosis. In another example, a pre-built annotator may be an assistance annotator that is specifically designed to analyze assistance terms and phrases that are included in the unstructured text. Via the selection of NLP characteristics, certain of these annotators may be de-activated.

In another example, certain classes may be de-activated or activated or particular settings relating to class identification may be altered. For example, one sub-class of a contextual finding class is a negation sub-class. A phrase indicated as a negation suggests the opposite of an identified attribute. For example, an attribute may be a particular medical condition, and the contextual finding class of "patient does not have history of" this particular medical condition contradicts a positive diagnosis of this particular medical condition. In this example, such negation terms may be de-selected from the flow such that they are not identified or perhaps are excluded from the search parameters.

Natural language processing is then applied (block 302) to the unstructured text based on the received user input. That is, the unstructured text may be analyzed and particular metadata tags may be associated with phrases in the unstructured text. The output of the natural language processing, that is the structured text output, is then received (block 303) and visual distinctions may then be generated (block 304) for at least one class. These operations may be done as described above in connection with FIG. 1.

In addition to generating (block 304) different visual distinctions per class, the computing system (FIG. 2, 200) may also generate (block 305) visual sub-distinctions of the visual distinctions for different values of at least one class. That is, sub-distinctions may be generated within a visual distinction, which sub-distinctions identify different values for a class. For example, different concepts may be identified with different sub-distinctions. Returning to the example where a concept class is identified with an underline, particular concepts may be identified with underline having different characteristics. For example, a first concept may be underlined with a line having one color or weight and a second concept may be underlined with a line having a different color or weight.

The generated visual distinctions and generated visual sub-distinctions may be applied (block 306, 307) to the text. In a specific example, concepts may be obtained from a text-based output of the NLP analysis and a color-coded underline may be applied to the phrases associated with each concept based on a beginning and ending span and the content instance from the annotation output. In this example, attribute phrases are also obtained from the text-based output from the NLP analysis and phrases associated with each attribute are highlighted, with a different color per attribute, based on a beginning and ending span identified in the annotation output. If a pre-built annotator annotation is found, a color-coded dotted underline may be associated with the phrase, again based on a beginning and ending span as identified in the annotation output. If a contextual concept finding class is found, a font color for the phrase associated with each contextual finding is applied. Examples of contextual concept findings include invalidation sub-classes, disambiguation sub-classes, and negation sub-classes. Each contextual concept finding may be assigned a specific font color to help the user quickly ascertain its meaning. For example, negation phrases may be represented by a font of a particular color and invalid phrases may be represented by a different color.

If the output of the annotator has terms that are to be filtered out, the associated visual distinction may also be applied. For example, these phrases may be marked with a visual indicator such as a strike through or gray text to indicate that the term is found from the concepts but is then removed due to a filter match.

Once all visual distinctions and sub-distinctions have been applied, the visually identified unstructured text may be displayed (block 308) along with the corresponding visual distinctions and sub-distinctions. This may be performed as described above in connection with FIG. 1.

Figure 4:
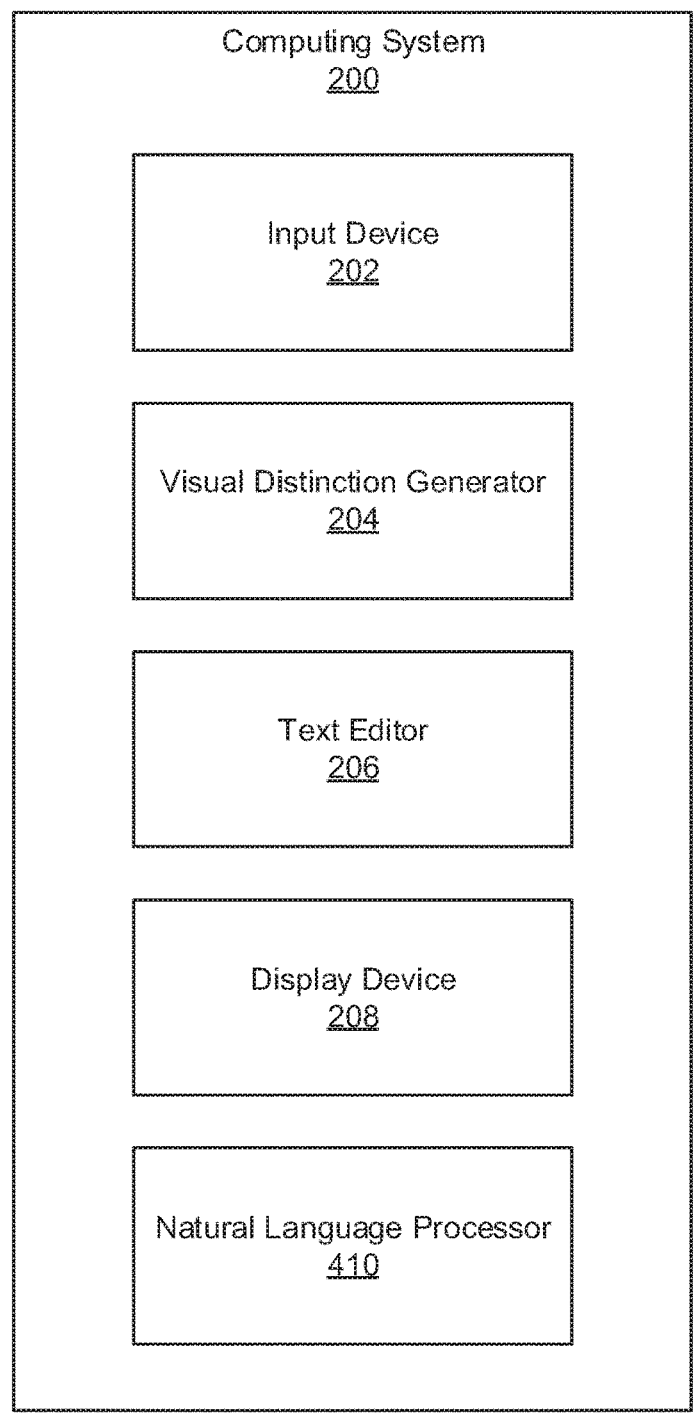
FIG. 4 depicts a computing system for displaying unstructured text with visual distinctions per class, according to another example of principles described herein.

FIG. 4 depicts a computing system (200) for displaying structured text with visual distinctions per class, according to another example of principles described herein. In this example, the computing system (200) includes the input device (202), visual distinction generator (204), text editor (206), and display device (208) as described above. In this example, the computing system (200) further comprises the natural language processor (410) that analyzes the unstructured text. That is, in some examples, the natural language processor (410) and the natural language processing occurs on a separate computing device from where the computing system (200) is located. However, in this example, the natural language processor (410) is included on the same computing device as the computing system (200) that performs the visually conversion of the output of the NLP output.

Figure 5:
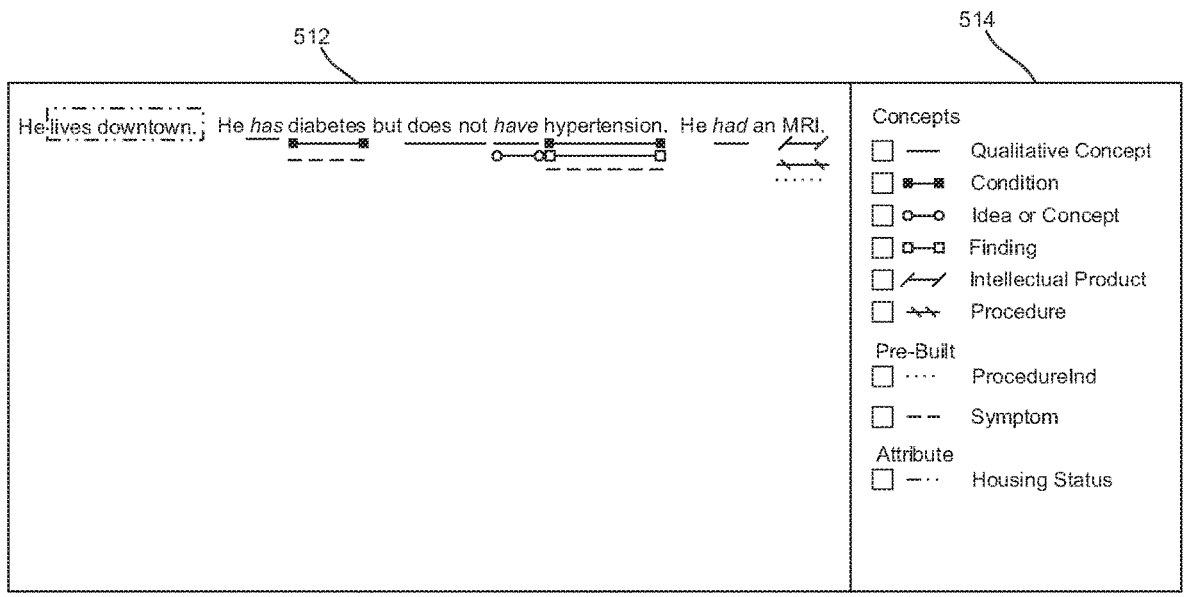
FIG. 5 depicts a display of unstructured text with visual distinctions per class, according to an example of the principles described herein.

FIG. 5 depicts a display of unstructured text with visual distinctions per class, according to an example of the principles described herein. In this example, a window (512) may be presented to the user where the unstructured text, in this example, the phrase "He lives downtown, He has diabetes but does not have hypertension. He had an MRI" is presented. As is depicted in FIG. 5, different classes are indicated differently. For example, the underlines represent concepts with broken underlines representing concepts from pre-built annotators. Boxed text represents attributes and italicized font refers to contextual information about concepts over the span.

FIG. 5 also depicts various sub-distinctions. For example, there are various underlines with different end points. Different types of endpoint indicate a different value for the class represented with an underline visual distinction. Specifically, in regards to FIG. 5, underlines with different endpoints represents different concepts or concept by types. While FIG. 5 depicts sub-distinctions as different end points, any type of sub-distinction may be used such as for example, different colors. As a specific example, different color underlines may be used to distinguish different concepts.

FIG. 5 also depicts a legend (514) that maps the different classes to the associated visual distinctions and that maps the different sub-distinctions to particular values of those classes. That is, the legend may identify which colors are associated with particular concepts. That is, a concept may be identified by an underline and the legend may indicate the mapping between underline endpoints and different concepts. As noted above, in other examples, different color underline may identify the different concepts. Via this legend, a user can manipulate the information displayed in the window (514). For example, a user could select to display just those visual distinctions associated with concepts while hiding those visual distinctions associated with attributes. Being able to manipulate the information displayed in the window (512) provides more control and more robust analysis of the NLP model to aid in the more effective development of said model.

Figure 6:
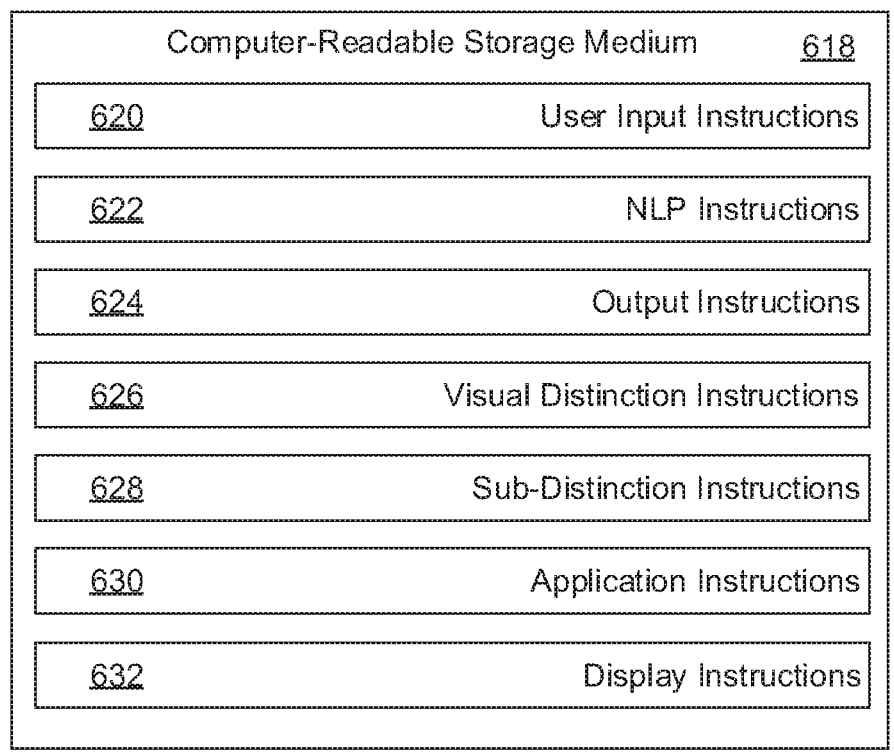
FIG. 6 depicts a computer program product with a computer readable storage medium for displaying structured text with visual distinctions per class, according to an example of principles described herein.

FIG. 6 depicts a computer program product (616) with a computer readable storage medium (618) for displaying unstructured text with visual distinctions per class, according to an example of principles described herein. To achieve its desired functionality, a computing system includes various hardware components. Specifically, a computing system includes a processor and a computer-readable storage medium (618). The computer-readable storage medium (618) is communicatively coupled to the processor. The computer-readable storage medium (618) includes a number of instructions (620, 622, 624, 626, 628, 630, 632) for performing a designated function. The computer-readable storage medium (618) causes the processor to execute the designated function of the instructions (620, 622, 624, 626, 628, 630, 632).

Referring to FIG. 6, user input instructions (620), when executed by the processor, cause the processor to receive user input regarding natural language processing characteristics. NLP instructions (622), when executed by the processor, may cause the processor to apply natural language processing to the unstructured text. Output instructions (624), when executed by the processor, may cause the processor to receive an output from the natural language analysis of unstructured text. In the output, different phrases of the unstructured text are categorized into classes that include a concept class, an attribute class, a pre-built annotator output class, a contextual concept finding class, a filtered term class, and a qualifier class. Visual distinction instructions (626), when executed by the processor, may cause the processor to generate a visual distinction for at least one class. Sub-distinction instructions (628), when executed by the processor, may cause the processor to generate a number of sub-distinctions for at least one visual distinction. In this example, a sub-distinction is associated with a different value within a class associated with a particular visual distinction. Application instructions (630), when executed by the processor, may cause the processor to apply generated visual distinctions and sub-distinctions to a respective class and value. Display instructions (632), when executed by the processor, may cause the processor to display the structured text such that phrases in the structured text corresponding to the at least one class appear with the corresponding visual distinction and sub-distinction indicative of that class and value.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor of the computing system or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The descriptions of the various embodiments of the present invention have been presented fir purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving an output resulting from natural language processing of unstructured text, wherein:
      the output comprises metadata tags indicating a class; and
      different phrases of the unstructured text are categorized into classes;
   generating a different visual distinction per class based on a mapping between a visual distinction and a metadata tag associated with a class;
   applying generated visual distinctions to phrases in the unstructured text based on their respective class;
   displaying the unstructured text such that phrases in the unstructured text corresponding to the at least one class appear with the corresponding visual distinction indicative of that class, wherein multiple visual distinctions associated with multiple classes are simultaneously displayed; and
   displaying a legend to:
      visually map classes to associated visual distinctions; and
      selectively display certain visual distinctions based on user input.

2. The computer-implemented method of claim 1, further comprising receiving user input regarding natural language processing characteristics.

3. The computer-implemented method of claim 2, further comprising applying natural language processing to the unstructured text.

4. The computer-implemented method of claim 1, wherein the classes comprise:
   a concept class;
   an attribute class; and
   a pre-built annotator output class.

5. The computer-implemented method of claim 1, wherein the visual distinctions are selected from a group consisting of:
   text underlining;
   text strike-through;
   text highlighting;
   text font;
   text font color;
   text font size; and
   text font style.

6. The computer-implemented method of claim 1, wherein:
   a concept class is associated with a text underline;
   an attribute class is associated with a text highlighting;
   a pre-built annotator output class is associated with a text dashed underline;
   a contextual concept finding class is associated with text highlighting of a distinct color; and
   a filtered term class is associated with a font style.

7. The computer-implemented method of claim 1, further comprising
   generating a number of visual sub-distinctions for at least one visual distinction, wherein a sub-distinction is associated with a different value within a class.

8. The computer-implemented method of claim 7, further comprising applying a corresponding visual sub-distinction to at least one value of a class.

9. The computer-implemented method of claim 7, wherein the visual sub-distinctions are selected from the group consisting of color and weight.

10. The computer-implemented method of claim 1, further comprising displaying a mapping between visual distinctions and classes.

11. The computer-implemented method of claim 1, further comprising displaying a mapping between visual sub-distinctions and class values.

12. The computer-implemented method of claim 1, further comprising allowing a user to select classes and values to display.

13. The computer-implemented method of claim 12, further comprising hiding visual distinctions based on user selection of unstructured text.

14. A computing system, comprising:
   an input device to receive metadata tags used to perform natural language processing of unstructured text, wherein:
      in an output of the natural language processing, different phrases of the unstructured text are categorized into classes based on the metadata tags;
   a visual distinction generator to generate a different visual distinction for each of multiple metadata tags;
   a text editor to:
      automatically apply generated visual distinctions to phrases in the unstructured text based on a mapping between the phrase, its respective class and a metadata tag; and
      automatically apply an additional visual distinction to phrases to be filtered out; and
   a display device to display:
      the unstructured text such that phrases in the unstructured text corresponding to a class appear with the corresponding visual distinction indicative of that class and a value associated with the class, wherein multiple visual distinctions associated with multiple classes are simultaneously displayed; and
      a legend to:
         visually map classes to associated visual distinctions; and
         select, through the legend, certain metadata tags to activate.

15. The computing system of claim 14, further comprising a natural language processor to analyze the unstructured text.

16. The computing system of claim 14, wherein the classes comprise:
a concept class;
an attribute class;
a pre-built annotator output class;
a contextual concept finding class;
a filtered term class; and
a qualifier class.

17. The computing system of claim 14, wherein at least one phrase is classified into multiple classes.

18. A computer program product, the computer program product comprising a computer readable storage medium having program instructions embodied therewith, the program instructions executable by a processor to cause the processor to:
receive user input regarding natural language processing characteristics;
apply natural language processing to the unstructured text;
receive an output resulting from natural language processing of the unstructured text, wherein in the output different phrases of the unstructured text are categorized into classes comprising:
a concept class;
an attribute class;
a pre-built annotator output class;
a contextual concept finding class;
a filtered term class; and
a qualifier class; and
generate a visual distinction for at least one class;
generate a number of sub-distinctions for at least one visual distinction, wherein a sub-distinction is associated with a different value within a class associated with a particular visual distinction;
apply generated visual distinctions and generated sub-distinctions a respective class and value; and
display the unstructured text in which phrases in the unstructured text corresponding to a class appear with the corresponding visual distinction and sub-distinction indicative of that class and value.

19. The computer program product of claim 18, further comprising program instructions executable by a processor to cause the processor to generate different visual distinctions for sub-classes of the contextual finding class.

20. The computer program product of claim 19, wherein the sub-classes of the contextual finding class comprise a negation sub-class, an invalidation sub-class, and a disambiguation sub-class.

* * * * *